United States Patent
Hayashi

[11] Patent Number: 5,928,445
[45] Date of Patent: Jul. 27, 1999

[54] PNEUMATIC TIRES WITH SPECIFIED PROFILE

[75] Inventor: Kazuo Hayashi, Kodaira, Japan

[73] Assignee: Bridgestone Corporation, Tokyo, Japan

[21] Appl. No.: 08/943,237

[22] Filed: Oct. 3, 1997

[30] Foreign Application Priority Data

Oct. 11, 1996 [JP] Japan .................................... 8-269877
Aug. 6, 1997 [JP] Japan .................................... 9-211609

[51] Int. Cl.⁶ ............................... B60C 3/00; B60C 3/04; B60C 15/00; B60C 15/06; B60C 9/02
[52] U.S. Cl. .......................... 152/454; 152/531; 152/536; 152/541; 152/546; 152/547; 152/548; 152/554
[58] Field of Search ...................................... 152/454, 554, 152/546, 548, 547, 539, 541, 536, 531

[56] References Cited

U.S. PATENT DOCUMENTS 5,016,697 5/1991 Noma .
5,361,820 11/1994 Adachi .

FOREIGN PATENT DOCUMENTS 0 595 653 A1 5/1994 European Pat. Off. .
2 102 746 2/1983 United Kingdom .

OTHER PUBLICATIONS

Patent Abstracts of Japan, vol. 010, No. 238 (M–508) Aug. 1, 1986 (JP 61 071202).
Patent Abstracts of Japan, vol. 008, No. 191 (M–322) Sep. 4, 1984 (JP 59–081207).
Patent Abstracts of Japan, vol. 018, No. 388 (E–1581) Jul. 20, 1994 (JP 06–112405).
European Search Report dated Jan. 19, 1998.

Primary Examiner—Adrienne C. Johnstone
Attorney, Agent, or Firm—Sughrue, Mion, Zinn, Macpeak & Seas, PLLC

[57] ABSTRACT

A pneumatic tire having an aspect ratio of not more than 55% comprises a carcass composed of a single carcass ply, in which a turnup end portion of the carcass ply is disposed between an end portion of a belt and a crown portion of the carcass ply, and distances $L_1$ and $L_2$ from a central position of a bead core to an outer end of a bead filler and to a maximum width of the carcass in the radial direction of the tire satisfy a relationship of $L_1 \geq L_2$ and within given ranges with respect to a section height (H) of the tire, respectively.

6 Claims, 1 Drawing Sheet

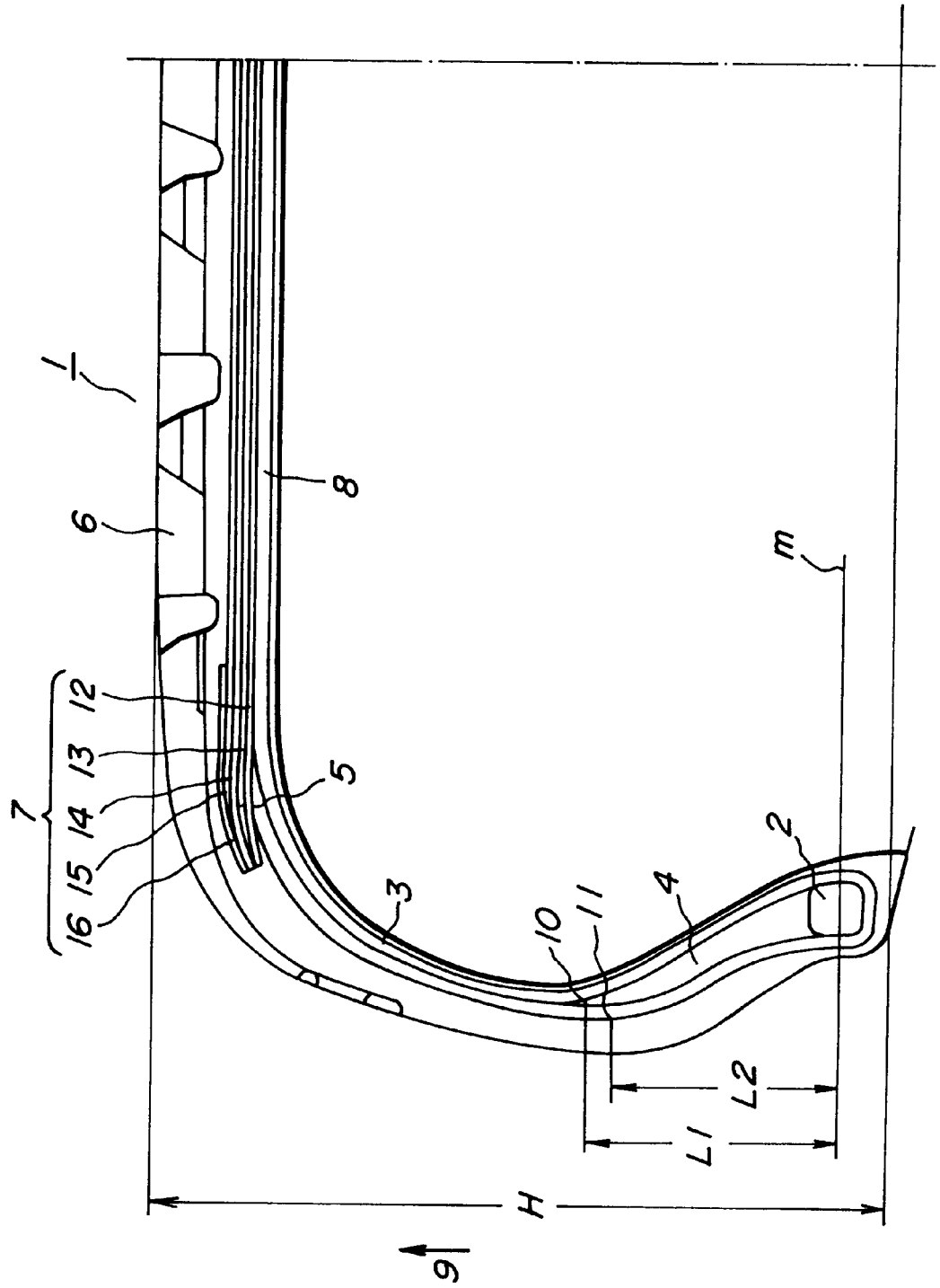

PNEUMATIC TIRES WITH SPECIFIED PROFILE

BACKGROUND OF THE INVENTION

1. Field of the Invention

This invention relates to a pneumatic tire or so-called high-performance tire balancedly satisfying a steering stability and a ride comfortability with the reduction of tire weight and having an aspect ratio of not more than 55%.

2. Description of Related Art

The high-performance tire is a pneumatic tire particularly attempting improvement of steering stability by reducing the aspect ratio and widening a tread width to increase a ground contact area currently such tires use a carcass comprised of two carcass plies for ensuring sufficient tire rigidity. However, it is increasingly demanded to attain low fuel consumption of a vehicle and hence it becomes important to reduce the tire weight. This is also true in case of the high-performance tire. As a result, it is attempted to develop a high-performance tire using a carcass comprised of a single carcass ply for the reduction of tire weight.

In the conventional high-performance tire using the single carcass ply, however, the tire is liable to be lacking in lateral rigidity and radial rigidity and hence sufficient steering stability can not be obtained. On the other hand, when a hard rubber is merely arranged as a bead filler for making up such a shortage, rigidity in the radial direction of the tire may become too large to degrade the ride comfortability.

SUMMARY OF THE INVENTION

It is, therefore, an object of the invention to solve the above problems in the conventional techniques and to provide a pneumatic tire or so-called high-performance tire having an aspect ratio of not more than 55% and capable of balancedly satisfying the steering stability and ride comfortability with the reduction of the tire weight. The tire of this invention comprises a single carcass ply, arranging a turnup end portion of such a ply between an end portion of a belt and a crown portion of the carcass ply, lowering a position of a maximum width of the carcass ply, and raising a position of an outer end of a bead filler in the radial direction of the tire.

According to the invention, there is the provision of a pneumatic tire having an aspect ratio of not more than 55%, and comprising a carcass toroidally extending between a pair of bead cores and consisting of a single carcass ply, in which a turnup end portion of the carcass ply wound around each bead core and a bead filler located above each bead core from inside toward outside is disposed between an end portion of a belt reinforcing a tread portion and a crown portion of the carcass ply, and when a distance from a straight line (m) connecting a pair of bead cores and passing through their central positions at a cross-section of the tire in a widthwise direction thereof up to a position corresponding to an outer end of the bead filler in a radial direction is $L_1$ and a distance from the straight line (m) up to a position corresponding to a maximum width of the carcass in the radial direction of the tire is $L_2$, the distances ($L_1$) and ($L_2$) satisfy a relationship of $L_1 \geq L_2$, and the distance ($L_1$) is within a range of 35–45% of a section height (H) of the tire and the distance ($L_2$) is within a range of 27–45% of the sectional height (H).

Furthermore, the term "section of tire in widthwise direction thereof" used herein means a cross-section of the tire in the widthwise direction when the tire is mounted onto a measuring rim defined by ETRTO and inflated to an air pressure corresponding to a maximum loading ability at a state of applying no load.

Moreover, the term "position corresponding to maximum width of carcass" used herein means a maximum width position in a turnup portion 3a of a carcass ply 3 wound around a bead core from inside toward outside (see FIG. 1).

BRIEF DESCRIPTION OF THE DRAWING

The invention will be described with respect to the accompanying drawing, wherein:

FIG. 1 is a diagrammatically left-half section view of a typical embodiment of the pneumatic tire according to the invention in a radial direction thereof.

DESCRIPTION OF PREFERRED EMBODIMENTS

In FIG. 1 is sectionally shown a typical embodiment of the pneumatic tire according to the invention, wherein numeral 1 is a pneumatic tire, numeral 2 a bead core, numeral 3 a carcass ply, numeral 4 a bead filler, numeral 5 a turnup end portion of the carcass ply, numeral 6 a tread portion, numeral 7 a belt, and numeral 8 a crown portion of the carcass ply.

The pneumatic tire 1 is a high-performance tire having an aspect ratio of not more than 55% and has so-called envelop structure such that the carcass toroidally extends between a pair of bead cores 2 is composed of the single carcass ply 3 and the turnup end portion of the carcass ply 3 wound around each bead core 2 and the bead filler 4 is located just above each bead core 2 from inside toward outside is disposed between an end portion 7a of the belt 7 reinforcing the tread portion 6 and the crown portion 8 of the carcass. Thus, the rigidity of the tire, which may be lacking when the carcass, is constituted with the single carcass ply can be supplemented by sandwiching the turnup end portion 5 of the carcass ply 3 between the belt end portion 7a and the carcass crown portion 8.

Moreover, the belt 7 shown in FIG. 1 is comprised of four rubberized cord layers 12–15 and a narrow-width rubberized cord layer 16 covering each of both ends of these layers 12–15. However, the arrangement and the number of these layers and the like may properly be changed, if necessary.

The term "end portion 7a of the belt" used herein means an end portion of an innermost rubberized cord layer among the plural layers constituting the belt as shown in FIG. 1.

In the pneumatic tire according to the invention, it is an essential feature that when a distance from a straight line (m) connecting a pair of bead cores 2 and passing through their central positions at a section of the tire in a widthwise direction thereof up to a position corresponding to an outer end 10 of the bead filler 4 in a radial direction 9 is $L_1$ and a distance from the straight line (m) up to a position corresponding to a maximum width 11 of the carcass in the radial direction of the tire is $L_2$, the distances $L_1$ and $L_2$ satisfy a relationship of $L_1 \geq L_2$.

The reason why the distances $L_1$ and $L_2$ satisfy the above relationship is due to the fact that since a bending center of a sidewall portion during the running of the tire under loading is approximately the maximum width position 11 of the carcass, a tire needing rigidity can be enhanced by reinforcing the portion corresponding to the maximum width of the carcass as the bending center with the bed filler 4.

However, even when the distances $L_1$ and $L_2$ satisfy the above relationship, there may be caused a case of balancedly satisfying both the steering stability and the ride comfortability.

For this end, the inventor has made further examinations and found that steering stability and ride comfortability can balancedly be satisfied by properly arranging the distances $L_1$ and $L_2$ with respect to a section height H of the tire, or concretely arranging the distances $L_1$ and $L_2$ within ranges of 35–45% and 27–45% with respect to the sectional height H, respectively.

The reason why the distance $L_1$ is limited to the range of 35–45% with respect to the sectional height H is due to the fact that when it is less than 35%, the bead portion is apt to be damaged under a large loading to degrade the bead portion durability. When it exceeds 45%, the flex zone in the sidewall portion becomes lacking to degrade the ride comfortability.

The reason why the distance $L_2$ is limited to the range of 27–45% with respect to the section height H is due to the fact that when it is less than 27%, the maximum width position 11 of the carcass as a bending center is located inward from the height of the rim flange in the radial direction of the tire and hence the flex zone becomes lacking to degrade the ride comfortability. When it exceeds 45%, the maximum width position 11 of the carcass is separated too far away from the rim and hence sharp steering control is damaged.

In the invention, the rubber hardness of the bead filler is favorable to be within a range of 80–100.

The term "rubber hardness" used herein means A-type spring hardness measured according to JIS K6301 (JIS-A).

The following examples are given in illustration of the invention and are not intended as limitations thereof.

EXAMPLE

A pneumatic tire according to the invention is prepared and the performances thereof are evaluated as follows.

The invention tire is a high-performance tire having a sectional shape shown in FIG. 1 and a tire size of 255/40ZR18, in which a carcass toroidally extending between a pair of bead cores 2 is composed of a single carcass ply 3 and a turnup end portion 5 of the ply 3 wound around each bead core 2 and a bead filler 4 located just above each bead core 2 from inside toward outside is disposed between an end portion 7a of a belt 7 reinforcing a tread portion 6 and a crown portion 8 of the carcass and the distances $L_1$ and $L_2$ are 40 mm and 35 mm ($L_1>L_2$) and are 45% and 39% with respect to a sectional height H of the tire, respectively.

The belt 7 has a lamination structure such that two wide-width rubberized layers 12, 13 each containing steel cords arranged at a cord angle of 22° with respect to an equatorial plane of the tire are laminated to cross the cords of these layers with each other and two wide-width rubberized layers 14, 15 each containing nylon fiber cords arranged in parallel to the equatorial plane are laminated thereon i.e., directly adjacent thereto, and a narrow-width rubberized layer 16 containing nylon fiber cords arranged in parallel to the equatorial plane is laminated on each of both end portions of the wide-width rubberized layers 12–15.

Moreover, the other tire structure is substantially the same as in the conventional high-performance tire.

Comparative Example 1

This tire has substantially the same structure as in the example tire except that the distances $L_1$ and $L_2$ are 43 mm and 38 mm ($L_1>L_2$) and are 50% and 44% with respect to the sectional height H, respectively.

Comparative Example 2

This tire has substantially the same structure as in the example tire except that the distances $L_1$ and $L_2$ are 23 mm and 20 mm ($L_1>L_2$) and are 30% and 26% with respect to the sectional height H, respectively.

Comparative Example 3

This tire has substantially the same structure as in the example tire except that the distances $L_1$ and $L_2$ are 33 mm and 38 mm ($L_1<L_2$) and are 40% and 46% with respect to the sectional height H, respectively.

Comparative Example 4

This tire has substantially the same structure as in the example tire except that the distances $L_1$ and $L_2$ are 16 mm and 30 mm ($L_1<L_2$) and are 23% and 43% with respect to the sectional height H, respectively.

Comparative Example 5

This tire has substantially the same structure as in the example tire except that the distances $L_1$ and $L_2$ are 43 mm and 50 mm ($L_1<L_2$) and are 50% and 58% with respect to the sectional height H, respectively.

Conventional Example

This tire has substantially the same structure as in the example tire except that the carcass is composed of two carcass plies and the position of the turnup end of the carcass ply is located downward from the maximum width position of the carcass by 10 mm and the distances $L_1$ and $L_2$ are 33 mm and 23 mm ($L_1>L_2$) and are 40% and 28% with respect to the sectional height H, respectively.

◎ Test Method

Each of the above tires is mounted onto a large-size high-performance sedan type vehicle and run on a test course of dry asphalt road surface at a speed of 50–180 km/h, during which the steering stability and ride comfortability are evaluated by a professional driver's feeling. Particularly, steering stability is evaluated by cornering property and handling progressiveness. Also, the tire weight is measured. The results are shown in Table 1. Each of the cornering property, handling progressiveness and ride comfortability in Table 1 is represented by a numerical value in 10-point process, in which the larger the numerical value, the better the property. On the other hand, tire weight is represented by an index value on the basis that the conventional example is 100, in which the smaller the index value, the lighter the weight.

TABLE 1

|  | Cornering property | Handling progressivenees | Ride comfortability | Tire weight |
| --- | --- | --- | --- | --- |
| Example | 7.0 | 7.0 | 7.5 | 95 |
| Comparative Example 1 | 7.5 | 7.5 | 5.5 | 97 |
| Comparative Example 2 | 5.5 | 5.5 | 6.0 | 93 |
| Comparative Example 3 | 6.5 | 6.0 | 6.5 | 94 |
| Comparative Example 4 | 5.5 | 5.0 | 6.0 | 91 |
| Comparative Example 5 | 7.5 | 7.6 | 5.5 | 97 |
| Conventional Example | 7.0 | 7.0 | 6.5 | 100 |

As seen from the results of Table 1, when the example is compared with the conventional example using the carcass comprised of two carcass plies, the tire weight can be reduced and the total performance of the steering stability and ride comfortability is excellent.

On the other hand, when Comparative Examples 1–5 are compared with the example, since any one of the relationship between the distances $L_1$ and $L_2$, ratios of the distances $L_1$ and $L_2$ with respect to the section height H of the tire is outside the acceptable range defined in the invention, either the steering stability or the ride comfortability is not attained to a satisfactory level, and hence both the performances can not well be balanced.

As mentioned above, according to the invention, it is possible to provide a pneumatic tire or so-called high-performance tire having an aspect ratio of not more than 55% and balancedly satisfying the steering stability and ride comfortability while realizing the reduction of the tire weight.

What is claimed is:

1. A pneumatic tire having an aspect ratio of not more than 55%, and comprising a carcass toroidally extending between a pair of bead cores and consisting of a single carcass ply, in which a turnup end portion of the carcass ply wound around each bead core and a bead filler located above each bead core from inside toward outside is disposed between an end portion of a belt reinforcing a tread portion and a crown portion of the carcass ply, and when a distance from a straight line m connecting a pair of bead cores and passing through their central positions at a cross-section of the tire in a widthwise direction thereof up to a position corresponding to an outer end of the bead filler in a radial direction is $L_1$ and a distance from the straight line m up to a position corresponding to a maximum width of the carcass in the radial direction of the tire is $L_2$, the distances $L_1$ and $L_2$ satisfy a relationship of $L_1 > L_2$, and the distance $L_1$ is within a range of 35–45% of a section height H of the tire and the distance $L_2$ is within a range of 27–45% of the section height H.

2. A pneumatic tire according to claim 1, wherein the bead filler has a JIS-A hardness of 80–100.

3. A pneumatic tire according to claim 1, wherein said belt comprises a first pair of wide-width rubberized layers, each layer containing steel cords arranged at a cord angle of 22° with respect to an equatorial plane of the tire, said first pair of layers being laminated to cross the cords of said layers with each other.

4. A pneumatic tire according to claim 3, wherein said belt further comprises a second pair of wide-width rubberized layers directly adjacent to and radially outside said first pair of wide-width rubberized layers, each layer of said second pair of wide-width rubberized layers containing nylon filer cords arranged parallel to the equatorial plane of the tire.

5. A pneumatic tire according to claim 4, wherein said belt further comprises a narrow-width rubberized layer containing nylon fiber cords arranged parallel to the equatorial plane, one said narrow-width rubberized layer being directly adjacent to and radially outside each of both end portions of said wide-width rubberized layers of said first and said second pair of wide-width rubberized layers.

6. A pneumatic tire according to claim 1, wherein $L_1$ is 40 mm, $L_2$ is 35 mm, $L_1$ is 45% of H and $L_2$ is 39% of H.

* * * * *